US012091868B2

(12) United States Patent
Bunch et al.

(10) Patent No.: US 12,091,868 B2
(45) Date of Patent: *Sep. 17, 2024

(54) TILE SPACING DEVICE AND ACCOMPANYING SYSTEM AND METHOD

(71) Applicant: Acufloor, L.L.C., North Richland Hills, TX (US)

(72) Inventors: Clinton D. Bunch, Keller, TX (US); Joshua A. Bunch, Keller, TX (US)

(73) Assignee: Acufloor, LLC, North Richland Hills, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,940

(22) Filed: Apr. 11, 2023

(65) Prior Publication Data

US 2023/0243163 A1 Aug. 3, 2023

Related U.S. Application Data

(63) Continuation of application No. 17/528,561, filed on Nov. 17, 2021, now Pat. No. 11,624,194, which is a continuation of application No. 16/416,584, filed on May 20, 2019, now Pat. No. 11,180,923.

(60) Provisional application No. 62/673,357, filed on May 18, 2018.

(51) Int. Cl.

*E04F 21/00* (2006.01)
*B67B 7/16* (2006.01)

(52) U.S. Cl.

CPC ................ *E04F 21/00* (2013.01); *B67B 7/16* (2013.01); *E04F 21/0092* (2013.01)

(58) Field of Classification Search

CPC ... E04F 21/00; E04F 21/0092; E04F 13/0889; E04F 15/02005; B67B 7/16

See application file for complete search history.

(56) References Cited

U.S. PATENT DOCUMENTS

| | | | |
|---|---|---|---|
| 5,010,654 | A | 4/1991 | Funes, Jr. |
| 6,508,010 | B2 | 1/2003 | Hanson et al. |
| D616,725 | S | 6/2010 | Burns et al. |
| 7,954,300 | B1 | 6/2011 | Kufner et al. |
| 8,181,409 | B1 | 5/2012 | Jones |
| D758,218 | S | 6/2016 | Bunch et al. |
| D758,899 | S | 6/2016 | Bunch et al. |
| 9,562,365 | B2 | 2/2017 | Bucsa |
| 9,765,532 | B2 | 9/2017 | Bunch |
| 11,180,923 | B2 | 11/2021 | Bunch et al. |

(Continued)

FOREIGN PATENT DOCUMENTS

| | | |
|---|---|---|
| EP | 0465394 | 1/1992 |

*Primary Examiner* — Babajide A Demuren

(74) *Attorney, Agent, or Firm* — Scott Griggs; Griggs Bergen LLP

(57) ABSTRACT

A tile spacing device and accompanying system and method are disclosed for spacing a plurality of tiles having a contour. In one embodiment of the tile spacing device, the tile spacing device includes a U-shaped band having a body with two branches extending parallel therefrom and an opening therebetween. An arm having a lateral end extends proximally from one of the branches into the opening. Two interlocking connectors are respectively positioned on the body at the opening and on the arm. In one embodiment of the system, two tile spacing devices complimentarily releasably mate when the tile spacing devices are opposing and perpendicularly displaced to interlock the interlocking connectors.

20 Claims, 3 Drawing Sheets

(56) References Cited

U.S. PATENT DOCUMENTS

| | | | |
|---|---|---|---|
| 11,624,194 | B2 | 4/2023 | Bunch et al. |
| 2009/0260317 | A1 | 10/2009 | Burns et al. |
| 2016/0376795 | A1 | 12/2016 | Irvine et al. |
| 2021/0293015 | A1 | 9/2021 | Gottschling |
| 2022/0074213 | A1 | 3/2022 | Bunch et al. |

TILE SPACING DEVICE AND ACCOMPANYING SYSTEM AND METHOD

PRIORITY STATEMENT & CROSS-REFERENCE TO RELATED APPLICATION

This application is a continuation of U.S. patent application Ser. No. 17/528,561 entitled "Tile Spacing Device and Accompanying System and Method" filed on Nov. 17, 2021 in the names of Clinton D. Bunch et al., now U.S. Pat. No. 11,624,194 issued on Apr. 11, 2023; which is a continuation of U.S. patent application Ser. No. 16/416,584 entitled "Tile Spacing Device and Accompanying System and Method" filed on May 20, 2019 in the names of Clinton D. Bunch, et al., now U.S. Pat. No. 11,180,923 issued on Nov. 23, 2021; which claims priority from U.S. Patent Application Ser. No. 62/673,357 entitled "Tile Spacing Device and Accompanying System and Method" filed May 18, 2018, in the names of Clinton D. Bunch and Joshua A. Bunch; all of which are hereby incorporated by reference, in entirety, for all purposes.

TECHNICAL FIELD OF THE INVENTION

This invention relates, in general, to tile installation and, in particular to a device for aligning tiles and properly spacing tiles during the installation thereof, and an accompanying system and method.

BACKGROUND OF THE INVENTION

Tile has become a popular decorative and functional article for use in floors, walls, countertops, and the like. Both professional tile installers and do-it-yourselfers spend a great deal of time aligning and spacing tiles as they are being placed on a substrate's surface. Proper alignment and spacing of each tile is important for a number of reasons. Improper installation can cause the need for tiles to be replaced in order to prevent a spacing error from propagating across the substrate, aesthetic reasons, and in some instances, safety concerns. A need exists for a device for aligning and properly spacing tiles.

SUMMARY OF THE INVENTION

It would be advantageous to achieve a device for aligning and properly spacing tiles. It would also be desirable to enable a mechanical-based solution that furnishes an inexpensive tool that assists professional tile installers and do-it-yourselfers. To better address one or more of these concerns, in one aspect of the invention, a tile spacing device and accompanying system and method are disclosed for spacing tiles are disclosed. In one embodiment of the tile spacing device, the tile spacing device includes a U-shaped band having a body with two branches extending parallel therefrom and an opening therebetween. An arm having a lateral end extends proximally from one of the branches into the opening. Two interlocking connectors are respectively positioned on the body at the opening and on the arm. In one embodiment of the system, two tile spacing devices complimentarily releasably mate when the tile spacing devices are opposing and perpendicularly displaced to interlock the interlocking connectors. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Figure 1:
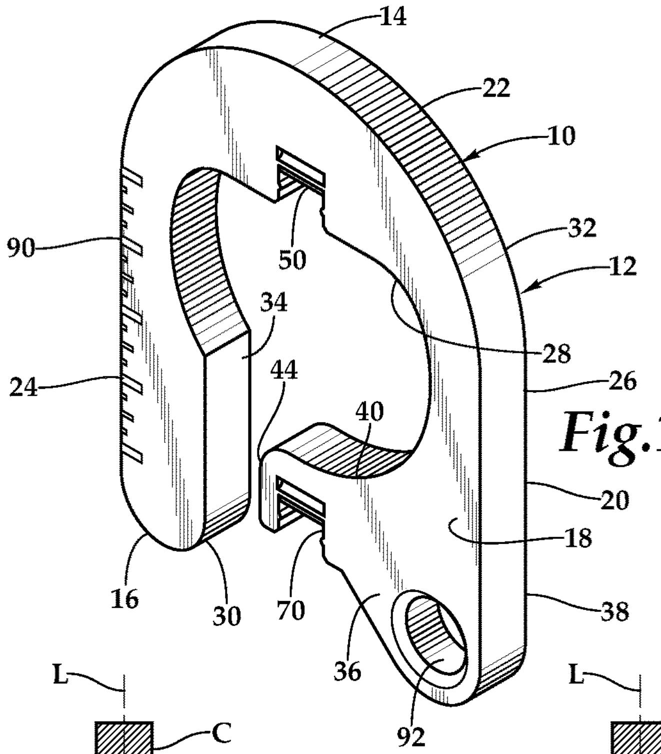
FIG. 1 is a front perspective view of one embodiment of a tile spacing device for spacing tiles according to the teachings presented herein.
Figure 2:
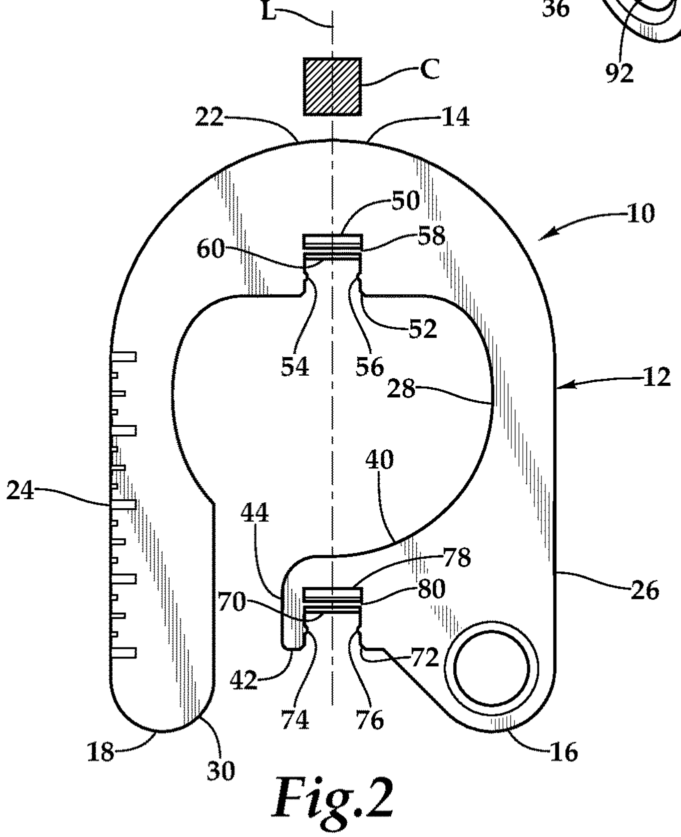
FIG. 2 is a front elevation view showing the tile spacing device depicted in FIG. 1.
Figure 3:
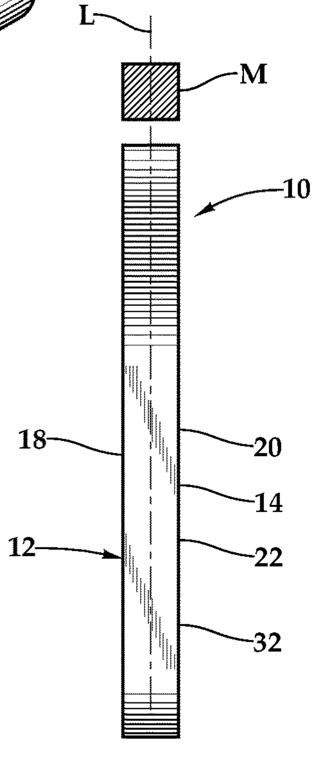
FIG. 3 is a top plan view showing the tile spacing device depicted in FIG. 1.
Figure 4:
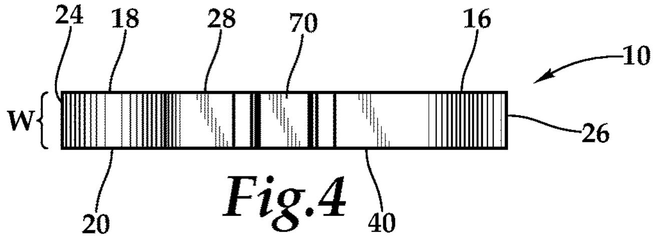
FIG. 4 is a bottom plan view showing the tile spacing device depicted in FIG. 1.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Referring initially to FIG. 1 through FIG. 4, therein is depicted one embodiment of a tile spacing device that is schematically illustrated and generally designated 10. With reference to the tile spacing device 10, a U-shaped band 12 includes an upper end 14 and a lower end 16 as well as a front surface 18 and a rear surface 20. As depicted, the U-shaped band 12 has a body 22 at the upper end 14 with branches 24, 26 extending parallel therefrom with an opening 28 therebetween. The opening defines an open span 30 at the lower end 16. The U-shaped band 12 includes an outer edge 32 and an inner edge 34 at the opening 28. The U-shaped band 12 of the tile spacing device 10 includes a width W to be interposed between two tiles as a spacer. As shown, the outer edge 32 may have the width W. The U-shaped band further comprises subterminal opposition surfaces, such as surfaces 36, 38, in which the palmar surfaces of the thumb and index finger hold the U-shaped band 12 therebetween.

A longitudinal axis L extends from the upper end 14 to the lower end 16 with the longitudinal axis L bifurcating the U-shaped band 12. In one embodiment, the longitudinal axis L bifurcates the U-shaped band 12 into two equal portions. Additionally, a median plane M and a coronal plane C bisect the tile spacing device 10. An arm 40 includes a lateral end 42 extending proximally from the branch 26 into the opening 28 and across the longitudinal axis L. The arm 40 defines a channel 44 between the lateral end 42 and the branch 24.

An interlocking connector 50 is positioned on the body 22 of the tile spacing device 10 at the opening 28. In one embodiment, the interlocking connector 50 is located in alignment with the longitudinal axis L. As shown, the interlocking connector 50 is oriented to face the opening 28. The interlocking connector 50 may be a snap fit engagement connector. It should be appreciated that other types of connectors may be utilized as well. In one embodiment, the interlocking connector 50 includes an entrance element 52 having opposing protrusions 54, 56 extending therefrom to the longitudinal axis L relative to a median plane M of the U-shaped band 12 of the tile spacing device 10. In this embodiment, a mating element 58 includes opposing depressions 60 (only one numbered) therein relative to the coronal plane C of the U-shaped band 12 of the tile spacing device 10.

An interlocking connector 70 is positioned on the arm of the tile spacing device 10 at the opening 28. In one embodiment, the interlocking connector 70 is located in alignment with the longitudinal axis L. As shown, the interlocking connector 70 is oriented to face the open span. The interlocking connector 70 may be a snap fit engagement connector. In one embodiment, the interlocking connector 70 includes an entrance element 72 having opposing protrusions 74, 76 extending therefrom to the longitudinal axis L relative to a median plane M of the U-shaped band 12 of the tile spacing device 10. A mating element 78 includes opposing depressions 80 (only one numbered) therein relative to a coronal plane C of the U-shaped band 12 of the tile spacing device 10. As shown, in one embodiment, the interlocking connector 50 and the interlocking connector 70 further comprise identical configurations. Further, the interlocking connector 50 and the interlocking connector 70 include complimentary mating configurations when opposing and perpendicularly displaced, as will be described further hereinbelow.

In one embodiment, indicia 90 are located on the branch 24. The indicia 90 may provide fractional measurement of inches or centimeters, for example. In one embodiment, a hole 92 is located in the branch 26 proximate the lower end 16. The hole 92 may provide a connection for an item to the tile spacing device 10. As shown, the hole 92 may be rounded and beveled. In one implementation, the tile spacing device 10 may include a balance to stand upright on the upper end 14. Further, the opening 28 of the tile spacing device 10 may be sized to mate with a bottle cap and assist in the opening of a bottle.

It should be appreciated that the tile spacing device 10 may vary from the tile spacing device depicted in FIG. 1 through FIG. 4. By way of example and not by way of limitation, the contours of the U-shaped band 12 may vary. As shown, the U-shaped band 12 is rounded. The band, however, may in addition to be U-shaped, be include rounded edges, hard edges, squared edges, and combinations thereof. As with other components of the tile spacing device 10, the contour and shaped of U-shaped band 12 will depend on the precise tile application as well as manufacturing equipment selected. It should be appreciated that the tile spacing device 10 is not limited to use with floor tiles. As used herein, the tiles may be traditional thin rectangular slabs of baked clay, concrete, or other material for covering floors or, more generally, substrates of any material including wood, finishing boards, or metal or the like used to cover a substrate, such as a horizontal surface or a vertical surface, such as a wall. Additionally, it should be appreciated that the tile spacing device 10 may be utilized by granite, marble, and limestone slab installers and for various standalone features such as glass walls, barriers, and protective railings, for example, which do not cover a substrate. Moreover, the installers of door frames and glass frames may use the tile spacing devices also. In addition to aligning and spacing, the tile spacing devices presented herein may be utilized for leveling, for example.

Figure 5:
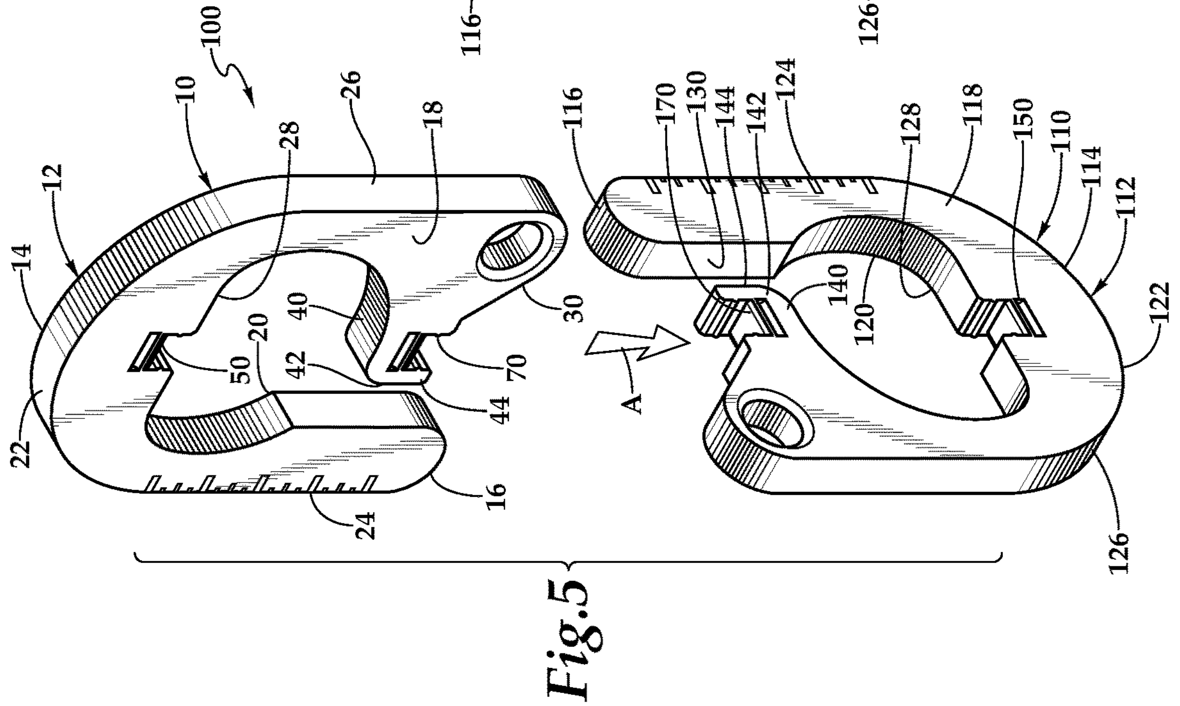
FIG. 5 is an exploded perspective view of one embodiment of a tile spacing system for spacing tiles according to the teachings presented herein, wherein two tile spacing devices are a distance apart.
Figure 6:
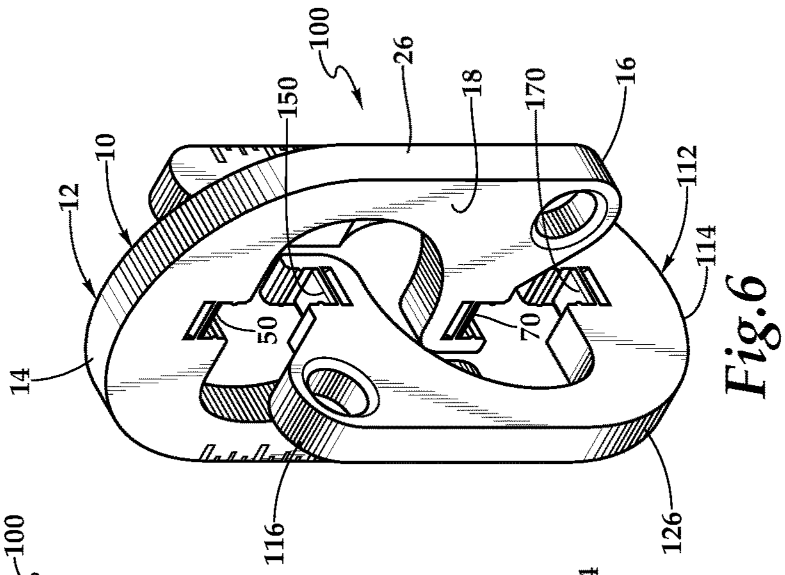
FIG. 6 is an exploded perspective view of one embodiment of the tile spacing system for spacing tiles, wherein the two tile spacing devices are preparing to be interconnected.
Figure 7:
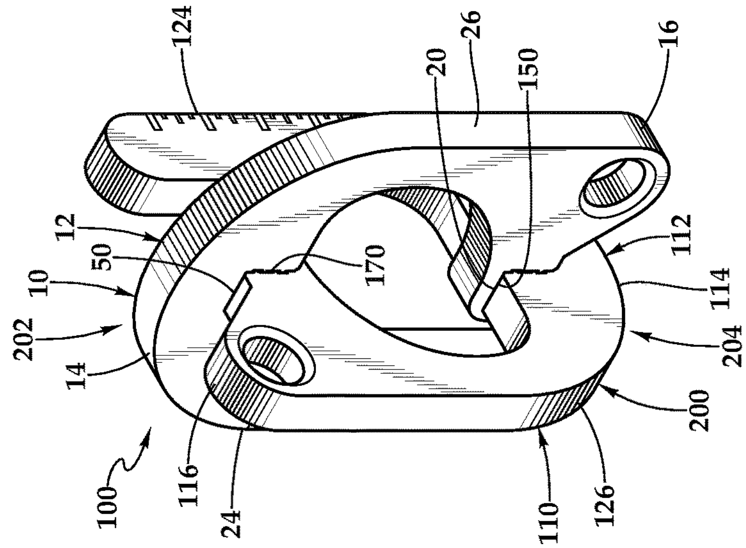
FIG. 7 is an exploded perspective view of one embodiment of the tile spacing system for spacing tiles, wherein the two tile spacing devices are interconnected.

Referring now to FIG. 5 through FIG. 7, a tile spacing system 100 for spacing multiples tiles is presented, which includes the tile spacing device 10 and a tile spacing device 110. The tile spacing device 110 may have a similar or identical construction to the tile spacing device 10. In one embodiment, the tile spacing device 110 includes a U-shaped band 112 having an upper end 114 and a lower end 116 as well a front surface 118 and a rear surface 120. As depicted, the U-shaped band 112 has a body 122 at the upper end 114 with branches 124, 126 extending parallel therefrom with an opening 128 therebetween and an open span 130 at the lower end 116. An arm 140 extends proximally from the branch 126 into the opening 128. The arm 140 defines a channel 144 between the lateral end 142 and the branch 124. An interlocking connector 150 is positioned on the body 122 of the tile spacing device 10 at the opening 128. An interlocking connector 170 is positioned on the arm 140 of the tile spacing device 110 at the opening 128.

As depicted, the tile spacing device 10 and the tile spacing device 110 complimentarily releasably mate when the tile spacing device 10 and the tile spacing device 110 are opposing end-to-end, such that the end of the tile spacing device 10 is facing the end of the tile spacing device 110, and the tile spacing devices 10, 110 are perpendicularly displaced. As shown by arrow A, in this manner, the interlocking connector 50 of the tile spacing device 10 mates with the interlocking connector 170 of the tile spacing device 110. Similarly, the interlocking connector 70 of the tile spacing device 10 mates with the interlocking connector 150 of the second tile spacing device 110. The tile spacing device 10 and the tile spacing device 110, once mated, define a tile spacing device 200, which is best shown in FIG. 7. A combination of the opening 28, the open span 30, and the channel 44 of the tile spacing device 10 and a combination of the opening 128, the open span 130, and the channel 144 may be utilized to bring the interlocking connectors 70, 150 into releasable mating contact and the interlocking connectors 50, 170 into releasable mating contact. As previously discussed, the releasable mating contact may be made by snap fit engagement, which may be released to disconnect the tile spacing device 10 and the tile spacing device 110 when the application is complete.

The tile spacing device 200 has a cage-like design which provides for two-tile engagement and four-tile engagement. Each branch 24, 26 of the tile spacing device 10 and each branch 124, 126 of the tile spacing device 100 provide a side furnishing two-tile engagement. An end 202 of the tile spacing device 200, which includes the upper end 14 of the tile spacing device 10 and the lower end 116 of the tile spacing device 100, furnishes four-tile engagement. Similarly, an end 204 of the tile spacing device 200, which includes the lower end 16 of the tile spacing device 10 and the upper end 114 of the tile spacing device 100, also furnishes four-tile engagement. As previously alluded, the tile spacing device 200 provides subterminal opposition surfaces in which the palmar surfaces of the thumb and index finger hold the tile spacing device 200 therebetween. This permits the tile spacing device 200 to be easily manipulated by hand for appropriate placement and use in a two-tile engagement or a four-tile engagement.

Figure 8:
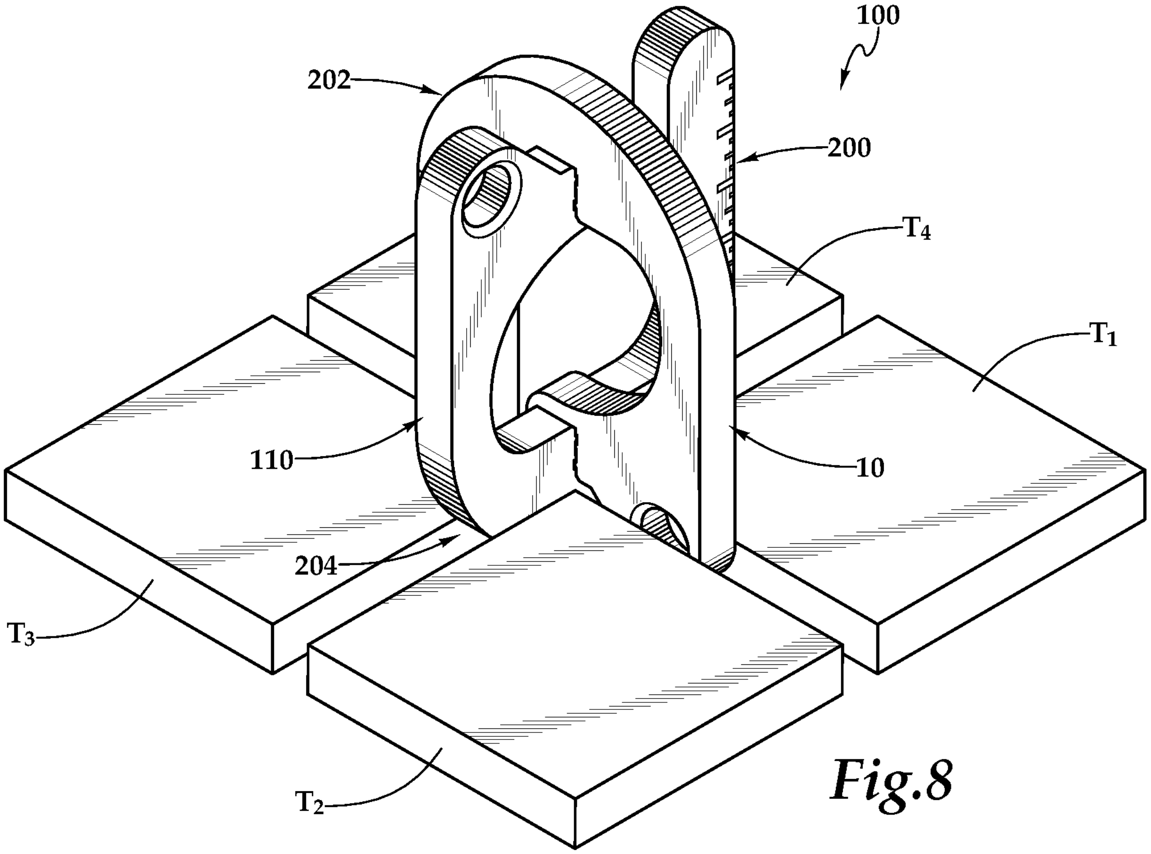
FIG. 8 is a front elevation view of one embodiment of the tile spacing system being utilized to align and space four tiles.
Figure 9:
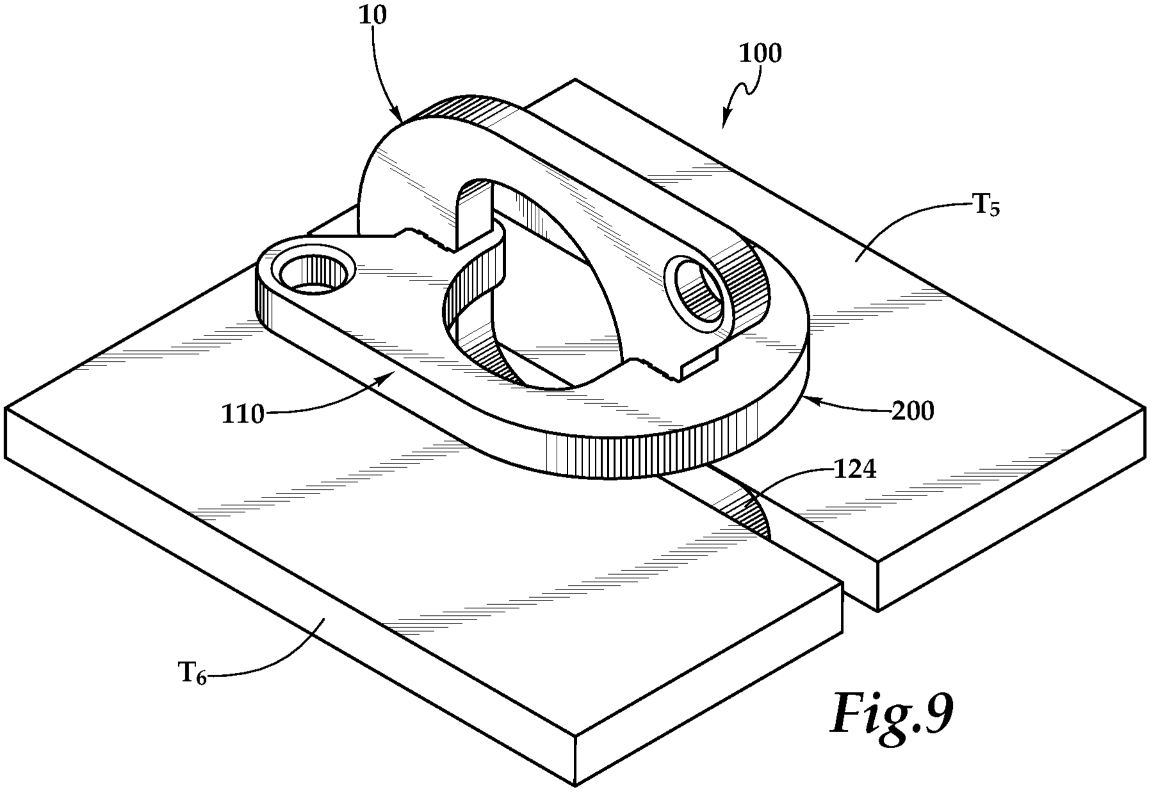
FIG. 9 is a front elevation view of one embodiment of the tile spacing system being utilized to align and space two tiles.

Referring now to FIG. 8, the tile spacing system 100 includes the tile spacing device 10 and the tile spacing device 110 in a mating configuration to space four tiles $T_1$, $T_2$, $T_3$, and $T_4$. In FIG. 8, the tile spacing device 200 has end 204 providing the four-tile engagement. Referring now to FIG. 9, the tile spacing system 100 includes the tile spacing device 10 and the tile spacing device 110 in a mating configuration to space two tiles $T_5$, $T_6$. In FIG. 9, the tile spacing device 200 has the branch 124 providing two-tile engagement.

As discussed, both professional tile installers and do-it-yourselfers spend a great deal of time aligning and leveling tiles as they are being placed on a substrates surface. Proper alignment and leveling of each tile is important for a number of reasons. Improper installation can cause the need for tiles to be replaced in order to prevent a spacing error from propagating across the substrate, aesthetic reasons, and in some instances, safety concerns. The tile spacing device and teachings presented herein provide a single spacing device that with a simple rotation of the device can be used to align and space two or four tiles.

The order of execution or performance of the methods and steps illustrated and described herein is not essential, unless otherwise specified. That is, elements of the methods and steps may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A tile spacing device for spacing a plurality of tiles, the tile spacing device comprising:

a band having a first end and a second end, the band having a body at the first end with first and second branches extending parallel therefrom with an opening therebetween, the opening defining an open span at the second end;

the band having a longitudinal axis from the first end to the second end, the longitudinal axis bifurcating the band;

an arm having a lateral end extending proximally from the second branch into the opening and across the longitudinal axis, the arm defining a channel between the lateral end and the first branch;

a first interlocking connector positioned on the body; and a second interlocking connector positioned on the arm.

2. The tile spacing device as recited in claim 1, wherein the band further comprises a width to be interposed between two tiles as a spacer.

3. The tile spacing device as recited in claim 1, wherein the band further comprises subterminal opposition surfaces in which palmar surfaces of a thumb and index finger hold band therebetween.

4. The tile spacing device as recited in claim 1, wherein the first interlocking connector and the second interlocking connector further comprise identical configurations.

5. The tile spacing device as recited in claim 1, wherein the first interlocking connector and the second interlocking connector further comprise complimentary mating configurations when opposing and perpendicularly displaced.

6. The tile spacing device as recited in claim 1, wherein the first interlocking connector and the second interlocking connector each comprise a snap fit engagement connector.

7. The tile spacing device as recited in claim 1, further comprising indicia located on the first branch, the indicia providing fractional measurement.

8. The tile spacing device as recited in claim 1, further comprising a hole located in the second branch proximate the second end, the hole providing a connection for an item to the band.

9. The tile spacing device as recited in claim 8, wherein the hole is rounded and beveled.

10. The tile spacing device as recited in claim 1, wherein the band further comprises a balance to stand upright on the first end.

11. The tile spacing device as recited in claim 1, wherein the opening is sized to mate with a bottle cap.

12. A tile spacing device for spacing a plurality of tiles, the tile spacing device comprising:

a band having a first end and a second end, the band having a width to be interposed between two tiles as a spacer, the band having a body at the first end with first and second branches extending parallel therefrom with an opening therebetween, the opening defining an open span at the second end;

the band having subterminal opposition surfaces in which palmar surfaces of a thumb and index finger hold the band therebetween;

the band having a longitudinal axis from the first end to the second end, the longitudinal axis bifurcating the band;

an arm having a lateral end extending proximally from the second branch into the opening and across the longitudinal axis, the arm defining a channel between the lateral end and the first branch;

a first interlocking connector positioned on the body;

a second interlocking connector positioned on the arm; and the first interlocking connector and the second interlocking connector configured to have complimentary mating configurations when opposing and perpendicularly displaced.

13. A tile spacing system for spacing a plurality of tiles, the tile spacing system comprising:

first and second tile spacing devices, each of the first and second tile spacing devices including:

a band having a first end and a second end, the band having a body at the first end with first and second branches extending parallel therefrom with an opening therebetween, the opening defining an open span at the second end, the band having a longitudinal axis from the first end to the second end, the longitudinal axis bifurcating the band, an arm having a lateral end extending proximally from the second branch into the opening and across the longitudinal axis, the arm defining a channel between the lateral end and the first branch, a first interlocking connector positioned on the body, and a second interlocking connector positioned on the arm;

the first tile spacing device and the second tile spacing device configured to complimentarily releasably mate when the first tile spacing device and the second tile spacing device are opposing second end-to-second end and perpendicularly displaced; and the first interlocking connector of the first tile spacing device mates with the second interlocking connector of the second tile spacing device.

14. The tile spacing system as recited in claim 13, further comprising, when the first tile spacing device mates with the second tile spacing device, a two-tile engagement configuration along each of the first and second branches of the first and second tile spacing devices.

15. The tile spacing system as recited in claim 13, further comprising, when the first tile spacing device mates with the second tile spacing device, a four-tile spacing configuration at each of the first end of the first tile spacing device/second end of the second tile spacing device and the second end of the first tile spacing device/first end of the second tile spacing device.

16. The tile spacing system as recited in claim 13, wherein the respective bands of the first and second tile spacing devices each further comprise a width to be interposed between two tiles as a spacer.

17. The tile spacing system as recited in claim 13, wherein the respective first interlocking connector and the second interlocking connector of the first and second tile spacing devices each further comprise a snap fit engagement connector.

18. The tile spacing system as recited in claim 13, wherein the band further comprises a shape selected from the group consisting of U-shapes, rounded edges, hard edges, squared edges, and combinations thereof.

19. The tile spacing system as recited in claim 13, further comprising indicia located on the first branch, the indicia providing fractional measurement.

20. The tile spacing system as recited in claim 13, further comprising a hole located in the second branch proximate the second end, the hole providing a connection for an item to the band.

* * * * *